3,119,766
INCREASING ANTIKNOCK VALUE OF OLEFINIC GASOLINE
Sterling E. Voltz, Middletown Township, Delaware County, and Raymond Wynkoop, Gladwyne, Pa., assignors to Sun Oil Company, Philadelphia, Pa., a corporation of New Jersey
No Drawing. Filed Oct. 10, 1960, Ser. No. 61,399
7 Claims. (Cl. 208—291)

This invention relates to a method of increasing the antiknock value of olefinic gasoline fractions by a selective partial etherification of certain types of olefinic components and separating the unreacted hydrocarbons from the resulting ethers. The invention can also be used for separating olefins of certain structural types from mixtures containing the same together with other olefins.

Olefinic gasolines produced by catalytic or thermal cracking contain a number of different structural types of olefins. Some are terminal olefins while others are internal olefins and the number of alkyl substituents on the two carbon atoms adjacent the double bond may vary from none to four. Also trans and cis isomers occur among some of the internal olefins. The various olefins can differ substantially in antiknock value depending upon their particular structural arrangements.

It has now been found that the olefins which have the lower antiknock values can be selectively reacted with alcohols under etherification conditions to form ethers which can readily be separated from the unreacted hydrocarbon portion. The fortuitous fact that the olefins having the lower antiknock values preferentially react permits this reaction to be utilized as a means of upgrading olefinic gasoline stocks with respect to octane rating. The ethers formed as by-products of the reaction can be recovered and are particularly valuable as solvents for various paint and varnish applications. Alternatively, the ethers can be converted back to alcohol and olefins having the certain types of structures corresponding to the olefins which underwent etherification, and the alcohol can be recycled to the etherification step.

Accordingly, the present invention provides a refining method for increasing the antiknock value of olefinic gasoline fractions. These stocks can be any olefinic gasoline fraction boiling in the range of 160–400° F. The method involves contacting a mixture of the olefinic gasoline and an alcohol with an acidic ion exchange resin at a temperature in the range of 50–150° C. and more preferably 60–125° C. The ion exchange resin functions as an etherification catalyst, causing the alcohol to combine in a selective manner with certain olefinic components while leaving other types of olefin structures substantially unreacted. The unreacted olefins have distinctly higher antiknock values than those which enter into the etherification reaction. Hence, by recovering the unreacted hydrocarbon portion from the reaction mixture, a product is obtained which has a higher octane rating than the original gasoline stock.

The alcohol used in the reaction can be any primary or secondary alcohol and it generally will have 1–12 carbon atoms per molecule. If desired, mixtures of such alcohols can be used. The preferred alcohol is methanol, as it usually gives faster etherification rates than the higher molecular weight alcohols. However, other primary and secondary alcohols, such as ethanol, isopropanol, butanols, hexanols, octanols, etc., are also suitable for practicing the process. The molar proportion of alcohol to olefins in the gasoline can vary widely but generally will be in the range of 0.3:1 to 20:1. more preferably, 1:1 to 5:1.

As the catalyst, any highly acidic ion exchange resin is satisfactory. These are generally composed of sulfonated resins, and various types of resins have been used in their preparation, e.g., polystyrene, phenolformaldehyde, coumarone-indene and the like. Porous forms of acidic ion exchange resins are known and are preferred for the present purpose.

One manner of conducting the reaction involves passing a liquid phase mixture of the olefinic gasoline stock and the alcohol at a temperature in the range of 50–150° C., more preferably 60–125° C., through a bed of the acidic ion exchange resin and allowing sufficient contact time to convert a substantial but minor proportion of the olefins to ethers. When the reaction temperature is above the boiling point of the alcohol or of some of the gasoline components, elevated pressure should be used to maintain the mixture in liquid phase. The effluent from the reaction zone is then processed for the separate recovery of the unreacted gasoline, the ester products and any excess alcohol. One manner of doing this involves distilling the unreacted olefins from the mixture as an azeotrope with excess methanol. Since the azeotrope is relatively low boiling as compared to the ethers formed from the reactive olefins, the unreacted olefins can readily be separated from the ethers in this manner except in cases where the boiling range of the olefinic gasoline feed is so wide as to cause an overlap in the boiling ranges of the ethers and the azeotrope formed with the relatively high boiling olefins. This overlap can be avoided for a wide boiling gasoline stock by first splitting it into narrower boiling cuts (e.g., fractions with 40° C. ranges) and processing each cut separately. In any event, after the azeotrope is distilled from the ethers, the alcohol should be separated from the unreacted olefinic gasoline in any suitable manner, e.g., by water washing. Recovered alcohol can be recycled to the etherification zone.

In another manner of carrying out the reaction, a mixture of the olefinic charge stock and the alcohol, considered as methanol for purpose of description, is boiled to continuously vaporize the azeotrope and the latter is passed into a reflux condenser from which it flows through a body of the ion exchange resin and back to the still. This can be done in a batch operation in which a sufficient time of refluxing is allowed to effect the desired degree of partial etherification.

The operation can also be conducted in continuous manner while effecting contact of the azeotrope and catalyst by reflux condensation. One manner of doing this involves the use of a moderate reaction temperature and a relatively low proportion of methanol to gasoline stock, under which conditions the reaction mixture will have two phases. For example, when 3 volumes of gasoline are used per volume of methanol and the refluxing temperature is 65° C., two phases will be obtained. The lighter phase is the unreacted gasoline containing almost all of the ethers, and the heavier is mainly methanol. Hence, by providing a settling zone adjacent the still, the gasoline phase containing the ethers can be continuously withdrawn while the reaction mixture is being refluxed and fresh gasoline stock and methanol can be continuously fed to the still, thus providing a continuous operation. The withdrawn gasoline layer is washed with water to remove the small amount of methanol contained in it, and the gasoline product can be separated from the ethers by distillation. The aqueous methanol can be distilled to recover the methanol which can then be recycled.

The following example illustrates the invention more specifically:

EXAMPLE

A Soxhlet type apparatus consisting of a 12 l. reaction pot connected to a reflux condenser which fed the reflux into a 1.5 l. extractor zone was used for the selective partial etherification of a propylene trimer boiling in the range of 260°–300° F. and obtained by the polymerization of propylene by means of a phosphoric acid polymerization catalyst. 800 g. of a highly acidic ion exchange resin of the sulfonated polystyrene type, sold commercially under the proprietary name "Amberlite IR–120 (H form)," was placed in the extractor and the pot was charged with 6 l. of the propylene trimer and 2 l. of methanol. 10 g. of KOH pellets were added as a precautionary measure in the event that some of the acidic resin should be washed into the reaction pot. The outlet to the condenser was connected to a cold trap to collect any low boiling material that might be formed. The reaction mixture was refluxed for a total of 72 hours and small samples of the pot mixture and also of the reflux were taken from time to time and analyzed. Results are shown in Table I.

*Table I*

| Reaction time, hrs | 2 | 4 | 24 | 48 | 72 |
|---|---|---|---|---|---|
| Reaction pot: | | | | | |
| Temp., °C | 67.5 | 67.5 | 68 | 69 | 69 |
| Vol. ratio of trimer: ether | 99:1 | 97:3 | 91:9 | 82:18 | 76:24 |
| Reflux: | | | | | |
| Temp., °C | 65 | 65 | 65 | 65 | 65 |
| Refractive index | 1.3493 | 1.3494 | 1.3460 | 1.3460 | 1.3462 |
| Trimer, Vol. percent | 21 | 21 | 18 | 18 | 18 |
| Methanol, Vol. percent | 79 | 79 | 82 | 82 | 82 |
| Cold trap, g. of product | | 2.8 | 18.0 | 35.9 | 50.5 |

From the tabulated data, it can be seen that ethers were continuously produced throughout the reaction period but that the rate of etherification tended to slow down in the latter part of the reaction period. This is a result of the etherification of the more readily reactable olefins. The azeotrope which refluxed had a boiling point about the same as the boiling point of methanol. As the reaction proceeded the amount of propylene trimer in the azeotrope dropped off slightly. The low boiling material which collected in the cold trap is believed to be dimethyl ether formed in small amount in the reaction. During this reaction, the mixture in the pot consisted of two phases as discussed hereinbefore.

After the 72 hour reaction period, during which about 24% of the total olefins was etherified, the reaction mixture was water washed to remove the methanol and the unreacted olefin was distilled from the ether products. Comparative octane rating tests were made on the charge trimer and the unreacted trimer for both leaded and unleaded samples. Results are given in Table II.

*Table II*

| Research Octane Numbers | Clear | 3 cc. T.E.L. |
|---|---|---|
| Charge trimer | 88.0 | 96.1 |
| Unreacted trimer | 91.7 | 98.2 |
| Difference | 3.7 | 2.1 |

These results show that the present method of treatment results in a distinct antiknock improvement for the olefinic gasoline, both leaded and unleaded. By way of comparison, the ethers produced had a Research Octane No. (clear) of only 80.2.

Infrared spectroscopic analyses were also performed on the various reflux samples taken during the reaction in order to determine which types of olefinic structures undergo etherification most readily. Results are shown in Table III along with the same type of analysis for the propylene trimer charge.

*Table III*

| | Trimer Charge | Reflux Samples | | | | |
|---|---|---|---|---|---|---|
| Reaction time, hrs | 0 | 2 | 4 | 24 | 48 | 72 |
| Terminal olefin structures: | | | | | | |
| $RC=CH_2$ ............percent | 4 | 5 | 5 | 5 | 5 | 5 |
| $R_1R_2C=CH_2$ ............do | 10 | 11 | 11 | 10 | 8 | 7 |
| Internal olefin structures: | | | | | | |
| $R_1HC=CHR_2$ (cis) ......percent | 4 | 4 | 4 | 4 | 4 | 4 |
| $R_1HC=CHR_2$ (trans) ......do | 16 | 18 | 17 | 19 | 22 | 23 |
| $R_1R_2C=CHR_3$ ............do | 32 | 30 | 28 | 27 | 21 | 17 |
| $R_1R_2C=CR_3R_4$ ............do | 34 | 32 | 33 | 35 | 36 | 44 |

The data in Table III show that branched terminal olefins and trisubstituted internal olefins are the most readily etherified of the olefin structures. The data also indicate that trans olefins are less reactive with the alcohol than cis olefins, since the concentration of trans olefins in the reflux increases as the reaction proceeds while that of cis olefins remains about constant. In any event, the olefins which are preferentially etherified are those with lower octane values as indicated by Table II.

It is apparent from the data in Table III that the invention can, if desired, be utilized for the selective separation of certain types of olefins from olefins of other structural types. The more reactive olefins, such as the branched terminal olefins and trisubstituted internal olefins, can be recovered from their etherification products by decomposition of the ethers at a temperature of the order of 175–300° C., either thermally or employing an acidic catalyst such as silica-alumina. When the ethers are decomposed thermally, i.e. without a catalyst, the original olefins that reacted are recovered. However, when an acidic catalyst is used, the olefins released tend to equilibrate to mixtures of olefins like the olefinic feed. Hence, they can be continuously recycled to the etherification step, permitting essentially all of the olefins to be obtained in the form in which they exhibit the best antiknock value.

We claim:

1. Method of increasing the antiknock value of an olefinic gasoline fraction which comprises contacting a mixture of said fraction and an alcohol selected from the group consisting of primary and secondary alcohols having 1–12 carbon atoms per molecule with an acidic ion exchange resin at a temperature in the range of 50–150° C., whereby a selective partial etherification of olefinic components occurs, and recovering from the reaction mixture an unreacted hydrocarbon fraction having an antiknock value higher than that of said gasoline fraction.

2. Method according to claim 1 wherein said alcohol is methanol.

3. Method according to claim 1 wherein an excess of alcohol over the amount required for said partial etherification is used, and said hydrocarbon fraction is recovered by distilling from the reaction mixture an azeotropic mixture of unreacted olefins and excess alcohol and then removing the alcohol from the unreacted olefin.

4. Method according to claim 3 wherein the alcohol is methanol.

5. Method according to claim 1 wherein the resulting ethers are decomposed in the presence of an acidic catalyst, whereby the ethers are converted back to olefins which tend to equilibrate resulting in a mixture of olefins of relatively low and relatively high antiknock values and said mixture of olefins is recycled for further etherification.

6. Method of separating a mixture of olefins boiling in the gasoline range according to structural types which comprises partially etherifying a mixture of such olefins by contacting the mixture and an alcohol selected from the group consisting of primary and secondary alcohols having 1–12 carbon atoms per molecule with an acidic ion exchange resin at a temperature in the range of 50–150° C., whereby a selective partial etherification occurs in which branched terminal olefins and trisubstituted internal olefins are preferentially etherified, and separating the ethers from the unreacted olefins.

7. Method according to claim 6 wherein the separated ethers are thermally decomposed to recover the corresponding olefins.

References Cited in the file of this patent

UNITED STATES PATENTS

| | | |
|---|---|---|
| 2,480,940 | Leum et al. | Sept. 6, 1949 |
| 2,552,436 | Bennett et al. | May 8, 1951 |
| 2,726,993 | Hickok et al. | Dec. 13, 1955 |
| 2,772,236 | Coonradt et al. | Nov. 27, 1956 |
| 2,846,359 | Myers | Aug. 5, 1958 |
| 2,847,362 | Kemp | Aug. 12, 1958 |
| 2,922,822 | Beach | Jan. 26, 1960 |